US011094009B2

(12) United States Patent
Fomukong

(10) Patent No.: US 11,094,009 B2
(45) Date of Patent: *Aug. 17, 2021

(54) METHOD AND SYSTEM FOR OBTAINING CREDIT

(71) Applicant: Mundi Fomukong, Los Angeles, CA (US)

(72) Inventor: Mundi Fomukong, Los Angeles, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/185,584

(22) Filed: Nov. 9, 2018

(65) Prior Publication Data

US 2019/0080401 A1    Mar. 14, 2019

Related U.S. Application Data

(63) Continuation of application No. 14/244,865, filed on Apr. 3, 2014, now Pat. No. 10,163,155.

(51) Int. Cl.
*G06Q 40/00* (2012.01)
*G06Q 40/02* (2012.01)
*G06Q 20/32* (2012.01)
*G06Q 20/40* (2012.01)

(52) U.S. Cl.
CPC .......... *G06Q 40/025* (2013.01); *G06Q 20/32* (2013.01); *G06Q 20/3224* (2013.01); *G06Q 20/40* (2013.01)

(58) Field of Classification Search
CPC .............................. G06Q 40/025; G06Q 40/00
USPC ....................................................... 705/38, 35
See application file for complete search history.

(56) References Cited

U.S. PATENT DOCUMENTS

| 8,655,773 | B1* | 2/2014 | Fasoli | G06Q 40/00 705/38 |
| 2008/0059317 | A1 | 3/2008 | Chandran | |
| 2008/0162316 | A1* | 7/2008 | Rampell | G06Q 30/0633 705/35 |
| 2009/0070263 | A1 | 3/2009 | Davis | |
| 2009/0228307 | A1 | 9/2009 | Sorbe | |
| 2009/0254441 | A1 | 10/2009 | Ahlers | |

(Continued)

OTHER PUBLICATIONS

PUBMED Central/ A secure Operational Model for Mobile Payments/ Jan. 1, 2014/ The Scientific World Journal 2014, (Year: 2014).*

(Continued)

*Primary Examiner* — Bruce I Ebersman
*Assistant Examiner* — John A Anderson
(74) *Attorney, Agent, or Firm* — SoCal IP Law Group LLP; Jonathan Pearce

(57) ABSTRACT

A communication system enabling a first wireless subscriber in need of an instant credit line to use a creditee module on a portable wireless communication device to request credit from a second subscriber that has available credit at a financial institution. The second subscriber uses a creditor module on their device to generate rules for the extension of a credit line guaranteed by the financial institution of the second subscriber. If the rules are met, a credit authorization code is generated by the system and forwarded to the creditee module of the first subscriber's device such that the code can be subsequently used to complete a transaction initiated by the first subscriber to pay a vendor. The vendor may then employ a vendor's module to access the issued credit as prescribed by the creditor module.

16 Claims, 4 Drawing Sheets

(56) References Cited

U.S. PATENT DOCUMENTS

| | | |
|---|---|---|
| 2010/0076880 A1 | 3/2010 | Williams |
| 2010/0306072 A1 | 12/2010 | Ford |
| 2011/0112919 A1 | 5/2011 | Gray |
| 2011/0191196 A1 | 8/2011 | Off |
| 2011/0191209 A1 | 8/2011 | Gould et al. |
| 2012/0029989 A1 | 2/2012 | Kogut |
| 2012/0059729 A1 | 3/2012 | Roa |
| 2012/0150605 A1 | 6/2012 | Isaacson |
| 2012/0330110 A1* | 12/2012 | Nishida .................... A61B 5/01 600/301 |
| 2013/0024360 A1 | 1/2013 | Bailout |
| 2013/0026232 A1 | 1/2013 | Zhou |
| 2013/0124412 A1 | 5/2013 | Itwaru |
| 2013/0179344 A1 | 7/2013 | Georgoulas et al. |
| 2013/0185202 A1 | 7/2013 | Goldthwaite |
| 2014/0070001 A1 | 3/2014 | Sanchez |
| 2014/0081854 A1 | 3/2014 | Sanchez |
| 2015/0019403 A1 | 1/2015 | Galit |

OTHER PUBLICATIONS

World Intellectual Property Organization, International Search Report and Written Opinion for International Application No. PCT/US2015/021334, dated Jun. 23, 2015, 14 total pages.

Monhana, "How Smartphones are Changing Small Business Lending". The Washington Post, Article, Published Dec. 6, 2013, 2 total pages.

* cited by examiner

METHOD AND SYSTEM FOR OBTAINING CREDIT

RELATED APPLICATION INFORMATION

This patent is a continuation of U.S. application Ser. No. 14/244,865, filed Apr. 3, 2014 entitled METHOD AND SYSTEM FOR OBTAINING CREDIT.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD

The field of the invention is financial transactions using mobile devices.

BACKGROUND

Today there are systems that allow a wireless service subscriber or user of a mobile device such as a cell phone, computer or other portable device to use the device to initiate a transaction to pay for goods and services at a remote location without directly using traditional methods such as a credit or debit card when completing the transaction.

Some of the prior art systems focus on wireless subscribers or consumers that already have available credit, i.e. credit card or debit card registered with an existing financial institution. The consumer, invoking a functionality running on a mobile computing or relevant communication device, can use an available credit line they have with a financial institution to pay for goods and services for themselves or an associate that may reside at a remote location. In other prior art systems, funds are actually transferred using a mobile device from an account of one mobile user to the account of another with the party transferring the funds having no control over how the funds are spent by the receiving party.

SUMMARY OF THE INVENTION

The present invention is directed to a communication system that allows a user of a mobile device, mobile creditee, to request credit from another consumer, mobile creditor. The mobile creditor is registered within the system to allow some of the creditor's available credit which they have with a bank or another financial institution extended to the requesting party in order to allow the requesting party to pay for the goods and services under a set of rules defined by the mobile creditor issuing the instant credit.

In a separate aspect of the present invention, a communication system is contemplated that includes a creditee module on a device that communicates with a vendor module of the system. The vendor module and the creditee module are also communicating with a remote system server by wireless or IP or other relevant communication means. The remote system server receiving instructions from a mobile creditor via the mobile creditor module running on a device being used by the mobile creditor, such information used by the system server to decide whether or not to extend, in advance, a portion of the credit held in the account of the mobile creditor to the mobile creditee.

In another separate aspect of the present invention, a registration mechanism of the mobile credit system is completed. Such a mechanism allowing a credit worthy party (mobile creditor) that wishes to issue credit to mobile creditees to register and set up policies/rules under which their credit can be issued when requested by a mobile creditee already approved by the mobile creditor to request for credit from the creditor to pay for goods and services at a remote geographic location. Such registration mechanism also allowing consumers to register as mobile creditees within the system to seek one or more mobile creditors for the purpose of obtaining an instant credit line. The registration mechanism also allowing vendors to register such that mobile creditees can use the instant credit line extended to them to purchase goods and services at a vendor's site of business.

In another separate aspect of the invention, a vendor communication module is contemplated. Such a module capable of being executed on a vendor's device that is registered to accept instant credit payments from a mobile creditee within the vendor's site. The vendor module is capable of communicating with the system server to obtain the necessary authorization to complete a transaction initiated by a mobile creditee.

In another separate aspect of the present invention, a consumer component is contemplated that runs on a device that is used by either a mobile creditee or creditor. Such a component either housing a creditee or creditor module that is used by the consumer to complete a transaction within the system.

In another separate aspect of the present invention, one or more methods that allow a user of the creditee module to request for credit from a mobile creditor to use at a vendor's site or geographic location is contemplated.

In another separate aspect of the present invention, one or more methods that allows a user of the creditor module to issue controlled credit to one or more mobile creditees to use at a vendor's site or geographic location is contemplated.

In another separate aspect of the present invention, one or more methods that allow a user of the vendor module to process transactions initiated by a mobile creditee to utilize their available instant credit to pay for goods and services at the vendor's site contemplated.

In another separate aspect of the present invention, one or more methods that allow the system server to process transactions between a mobile creditee, mobile creditor, vendor and other financial institutions are contemplated.

In another separate aspect of the present invention, any of the foregoing aspects are contemplated to be combined.

Thus, it is an object of the present invention to provide an improved mobile credit communication system. Other and further objects and advantages will appear hereafter.

DETAILED DESCRIPTION

Figure 1:
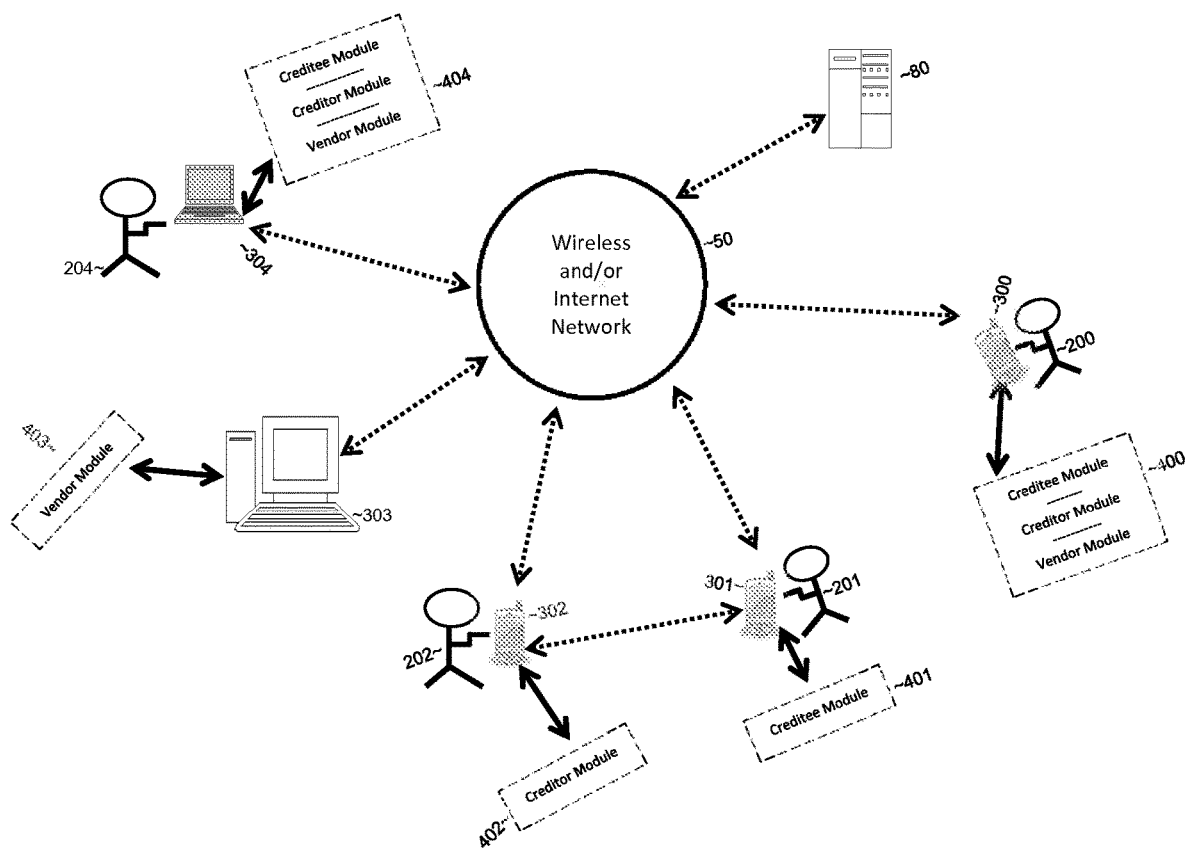
FIG. 1 shows a network of components of a remote credit system

Consumers may find themselves in a situation without any credit or partial credit to pay for goods and services on the road. Even though these pool of consumers may be short of credit or have no credit line with a financial institution, they might know someone, i.e. family, friend, associate, that has credit with a financial institution (mobile creditor) that may be willing to instantly extend a portion of their credit via a mobile device in a controlled fashion such that the consumer needing credit (mobile creditee) can use the extended credit to pay for goods and services as specified by a criteria approved by the mobile creditor. This will enable the mobile creditor to assist in the payment of goods and services of another party whenever they choose and under their own set of rules without transferring any funds directly into the account of the mobile creditee and without waiting for a mobile creditee to send purchase details at the POS of a vendor's location to in order for their transaction to be approved. Further, another advantage of using this system is that a mobile creditee can obtain credit from a mobile creditor in advance of actually checking out any products/services at the POS of a vendor, giving the creditee the peace of mind that their transaction will be approved since they are already in possession of the required credit.

As credit can be issued to the creditee in advance, the creditee may be allowed to use the credit based on a criteria set by creditor. Since the mobile creditor knows the individual (mobile creditee) they are extending credit to, the mobile creditor is better placed than banks or other institutionalized credit companies to make such a decision as they better understand the needs and behavior of the mobile creditee. Anyone that is credit worthy with a financial institution can enroll in the system and establish rules that will enable a part of their available credit line extended to an associate that may be in need of instant credit at a remote location. One or more of such rules or criteria that can be established by the mobile creditor may include amount of credit to be extended to the mobile creditee at an instant when they submit a request, timeframe for the credit to expire, type of goods and service creditee is allowed to purchase with the extended credit, location of vendor that should receive the credit, etc. Such a system can be used by a mobile creditee to pay for goods and services using the credit line issued by a mobile creditor.

The mobile creditor and mobile creditee do not need to share a credit card or bank account. The mobile creditor will simply, on their choosing, extend credit on controlled terms to the mobile creditee such that the creditee can used the instant credit to purchase goods and services needed.

The advantages as would be seen later would be enormous. In a family or business, a party in possession of credit need not share the same credit card accounts with other related parties that may have uncontrollable spending habits. Rather, the responsible party can use the system to instantly issue mobile credit to family members or affiliates as needed. Since the mobile credit device is location enabled, it will be easy to provide list of vendors that support such a service within a geographic area so consumers needing to use the system can find a vendor that offers the service.

To vendors, this will bring new business and opportunities at their doorstep. For instance, if a distressed mobile creditee is in need of a product or service, for example gas or food supplies, they may request for mobile credit from a mobile creditor to use at a specific location. The mobile creditor may approve such a transaction by setting a criteria for approval under which their credit can be extended for used at a vendor's location to pay for a product or service desired by the mobile creditee. This brings in new business for the vendor that they would have been missed had credit not been extended to the mobile creditee. In today's market, additional revenue may be generated by structuring the service such that a onetime fee is charged each time a mobile creditee uses the system at any participating vendor's facility. This is definitely an opportunity to generate new business revenue.

As an example, parents may also use it to pay for expenses on the fly for their kids without issuing them any credit cards that they have no control how their funds are spent. To a parent or mobile creditor, they can use the system to decide when and how and where a mobile credit they extend is used by a family member, friend or associate to purchase a product or service in a restaurant, retail shop, doctor's office or any desired geographic location. Also there could be a time timeframe for the credit to expire after it is issued to the mobile creditee. After such a time, the mobile creditee cannot use the credit at that location to purchase any good or service. Other advantages of this system will appear hereinafter.

The preferred embodiment is directed to a system and method that enables a user of a mobile device, mobile creditee, that is in need of purchasing credit to request and obtain an instant credit line from an associate, mobile creditor, that has an existing line of credit with a financial institution. After the mobile creditor approves the credit request, the credit is issued to mobile creditee who is free to go to any participating vendor's location and use the credit as specified by the mobile creditor. Some of the embodiments of the disclosure are described hereinafter with supporting figures and illustrations that will show examples of how the system will function.

Overview of System Components

As illustrated in FIG. 1, the system will comprise of one or more consumer devices 300-304, such as a cellular phone, laptop, pager or relevant computing device that may be location enabled and housing a creditee module 401, creditor module 402, and vendor module 403 for serving a mobile creditee 201, creditor 202, and vendor 303. The mobile creditee or creditor module can communicate with any available vendor module, possibly via the system server 80 or directly through another communication means. At least the creditee module should reside on a portable mobile telecommunication device 300, 301, 304 that a creditee carries around to make request for credit and make purchases as they travel from one location to the next. Communication between these modules is facilitated over any wireless and/or wireline communication network 50. A mobile creditee 201 in possession of a portable mobile device 301 and travelling from one geographic location to the next may at some point need to request for instant mobile credit to pay for certain good and services. The mobile creditee will invoke a creditee module 401 on their portable device to assist them to request and obtain advanced credit from the system. Note that use of location technologies such as GPS, Cell ID, etc. that are used to position a portable mobile device within a communication network are well known in the art and could be employed to determine the location of a creditee's mobile communication device within the system.

As indicated, a mobile creditor 202 will be the party that can extend credit within the system and a mobile creditee 201 is a party that uses the credit extended by the mobile creditor to pay for goods and services at a later time. The vendor is the party or merchant 303 selling goods and services within the system.

A mobile creditor will register within the system. Such registration information will include data such as mobile creditor phone number, identity and relevant banking or credit card information that can be used by the mobile creditor as a guarantee to extend credit to one or more mobile creditees that are submitting request for credit to facilitate payment for goods services when a creditee visits a vendor's site. Such registration information and other data used within the system may be stored on the system sever 80 or at any other device repository within the system. A mobile creditor will serve as a credit guarantor for their associates, family members and friends who they which to extend a portion of their credit to from time to time.

Once a mobile creditor is registered within the system and approved, they can download and install a consumer creditor module 402 on any computing device (mobile phone, home computer etc.), i.e. mobile phone 302, of their choosing. The creditor module will be used by the mobile creditor to extend credit to one or more registered mobile creditees according to criteria specified by the mobile creditor that covers a set of rules under which their credit will be used by the creditee. Such criteria may include rule information such as amount of credit to be extended to the mobile creditee, circumstances under which the credit extended should expire after it is issued, vendor name and/or location where the credit can be used, type of goods and services that can/cannot be purchased using the credit extended. As needed, the consumer module serving the mobile creditor (creditor module) will support a wide range of available rules allowing the mobile creditor to pick and choose, if applicable, when, how and where a mobile creditee can use any credit the creditor extends to them. The system will offer a simple a la carte list of rules which a mobile creditor can select and apply to one or more of their mobile creditees when a credit is issued to the mobile creditee. Tools can also be added to allow a mobile creditor to create more complex creditee related rules.

Consumers 201, 200, etc. that will be needing credit from a mobile creditor will register within the system. At least information for identifying the mobile creditee which will include a mobile phone number that will host the creditee module will be needed for registration.

Once the mobile creditee is approved, the creditee can download and use a creditee module on a device, preferably mobile device that will enable them to request for credit from mobile creditors that have agreed to extend a portion of their credit to the creditee. The creditee should be able to use the creditee module to send a phone number of a friend, colleague or third party to the system server to determine whether or not that third party is a mobile creditor within the system.

Mobile creditors may choose to block or reveal information identifying them as a mobile creditor only to selected parties identified possibly by phone numbers which the creditor registers within the system. If such a rule is in place, potential mobile creditees that are not in the creditors profile and are seeking information on whether that creditor is registered will not be provided that information. On the other hand, a mobile creditee can send a message to a friend or colleague asking them to allow them to be register as a creditee under their profile.

Once the creditor registers the creditee within their profile, the creditee can now use the creditee's module to be registered as a mobile creditee under that creditor. Once the mobile creditee sends a phone number of a creditor to the system server that is valid and passes the creditor's enrollment rules, the creditor is notified that the creditee wishes to join the credit profile. Once the creditor accepts, the creditee is allowed to request credit from the creditor within the system, such credit request subject to approval after creditor rules are validated.

To extend instant credit to mobile creditees to purchase goods and services, vendors selling the goods and services are registered within the system to participate. All a participating vendor will do is register their identity on the system as a participating vendor and setup an account or proxy accounts where payments received for goods and services will be held. Once a vendor is approved, they can run a vendor component installed on their device to facilitate communication with a creditee module, creditor module and the system server. If a vendor is at a static physical location, that information can be loaded on the system server. Alternatively, a vendor may choose to allow the vendor's module to best determine their location depending on the platform that the vendor's module is running on. For example, the IP address or GPS coordinates of the device housing the vendor module can be used to determine the location of that vendor. If a vendor also registers a product or service code associated with their business, the system can easily provide that information to a creditee or creditor module that is searching for a list of participating vendors at a specified geographic location that are offering a specific service or product. As needed, participating vendors will be alerted as to the availability of a mobile creditee needing their services within their geographic location. This may be useful particularly to a store owner or vendor if a mobile creditee is within the vicinity of the store such that the store owner can make provisions to promptly attend to the needs of the mobile creditee.

Implementation and Preferred Embodiments

Figure 2:
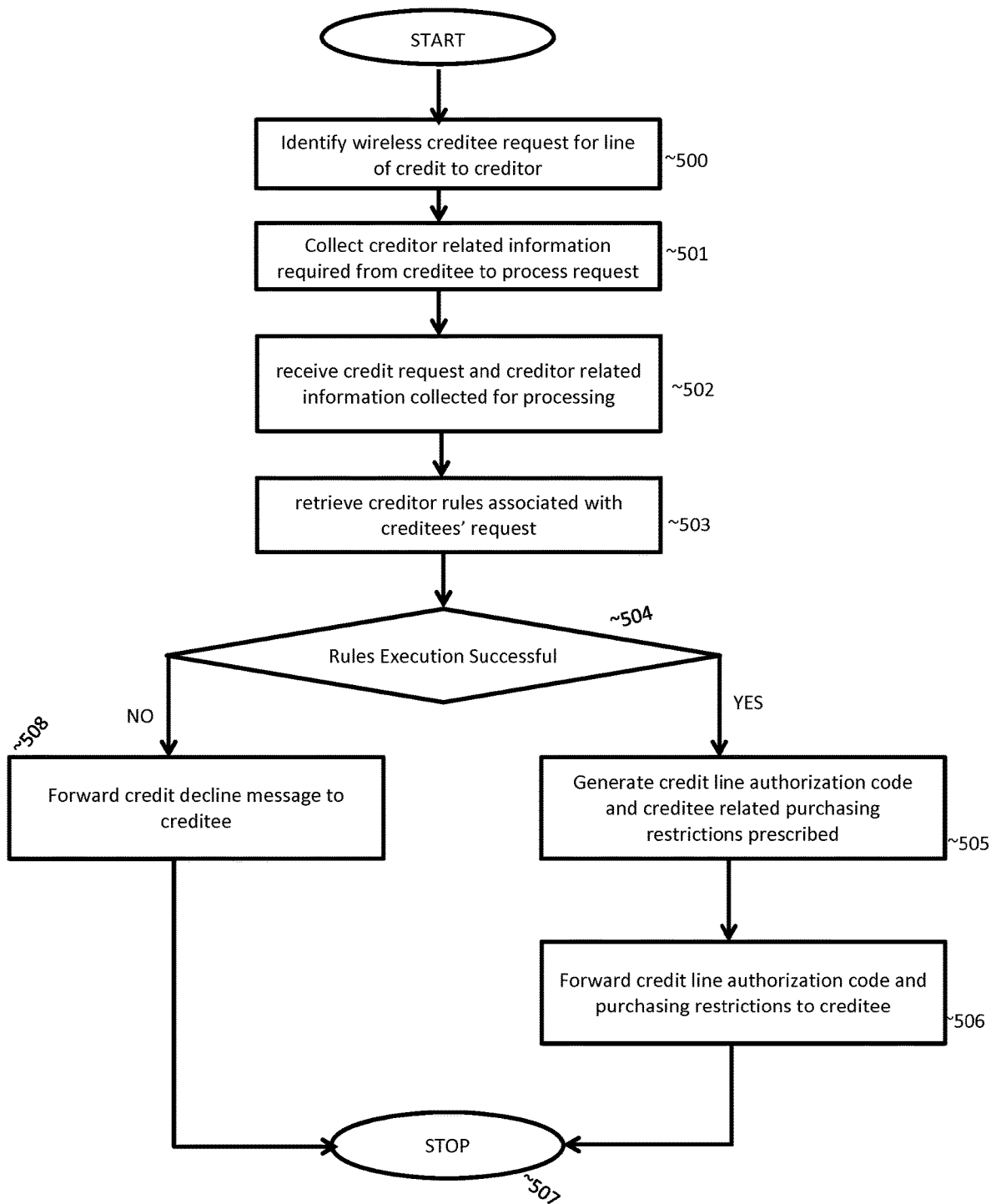
FIG. 2 shows steps used within the system to issue a credit line authorization code to a mobile creditee that submitted a credit line request to a creditor.

In one embodiment, according to FIG. 2, a mobile creditee in possession of a wireless portable device and in need of credit from a creditor for a certain amount to make a purchase uses the creditee module on their device to view a list of eligible mobile creditors that are available to extend credit to the mobile creditee, step 500. A list of vendors that are subscribed to the system and the product and services that they offer within the vicinity or geographic location specified by the mobile creditee is made known to the mobile creditee. The mobile creditee then selects one or more mobile creditors, and in this example, an amount they wish to spend at a vendor's premises for approval by a mobile creditor.

The mobile creditee module upon detecting that a creditor has been selected will attempt to verify which additional information, if any, the selected mobile creditor requires the creditee to provide before extending credit to the creditee, step 501. As an example, assuming the mobile creditor requires a vendor to be selected first before they can decide whether to extend credit to the mobile creditee, the creditee module will force the creditee to select a participating vendor to enable their request to be processed. In another example, the mobile creditor may require that a product or service related information is provided by the mobile creditee before credit can be extended to the creditee to purchase the product or service. Under this circumstance, the creditee module upon execution of the required rules pre-approved by the creditor as a requirement to consider a creditee's request for credit will ensure that any information required by the creditor to decide whether or not to extend credit to the creditee is collected, step 501, for submission to system.

The creditee's request and information collected for the creditor is then forwarded to the system server which then authenticates the request, step 502, and invokes another creditor's set of rules, step 503, to determine whether the creditor has approved the requested credit to be extended to the mobile creditee from the creditors account, step 504. The functions invoked by the system will include execution of rules that the creditor has setup for a mobile creditee requesting credit, step 504. As an example, one of such rules may require that a voice communication link be set up between the mobile creditor and the mobile creditee, after which the mobile creditor will approve or deny the request using the mobile creditor module on their device. In another example, the creditor function may simply allow every request for credit for a particular mobile creditee to be granted if within a certain amount, geographic location or timeframe. A mobile creditor's function will include rules that should be executed when a request for credit is received from a mobile creditee within the system.

If the credit requested is approved by the rules set by the mobile creditor, step 504, an acknowledgement is sent to the mobile creditee and to the mobile creditor with further information indicating that the creditee has been extended an instant credit line and criteria under which, if any, step 505, the credit line will be used. A credit authorization code will then be sent to the mobile creditee, step 506, such that it can be used at a vendor's location to close a transaction. Such credit authorization code may simply be the phone number of the mobile creditees' device and/or with other encoded authorization information that a vendor's module should decode to enforce any outstanding creditor related purchasing rules at the time that the creditee chooses to close the transaction, step 506. Also, a time span for using the approved credit may also be included by the mobile creditor such that the credit line extended to the mobile creditee is limited by time related information such that it expires if not used within a specified time period.

The creditee's module, upon receiving the credit related authorization information from the system server extended by the mobile creditor, then alerts the mobile creditee as to creditor requirements, if any, for the creditee to use the credit line i.e. time period that credit line will expire, credit for gas purchase only, food and beverage only, at a specific vendor only, at a specific geographic location only, etc. That way a creditee is fully aware of how the credit line extended will be accepted by the system.

Figure 3:
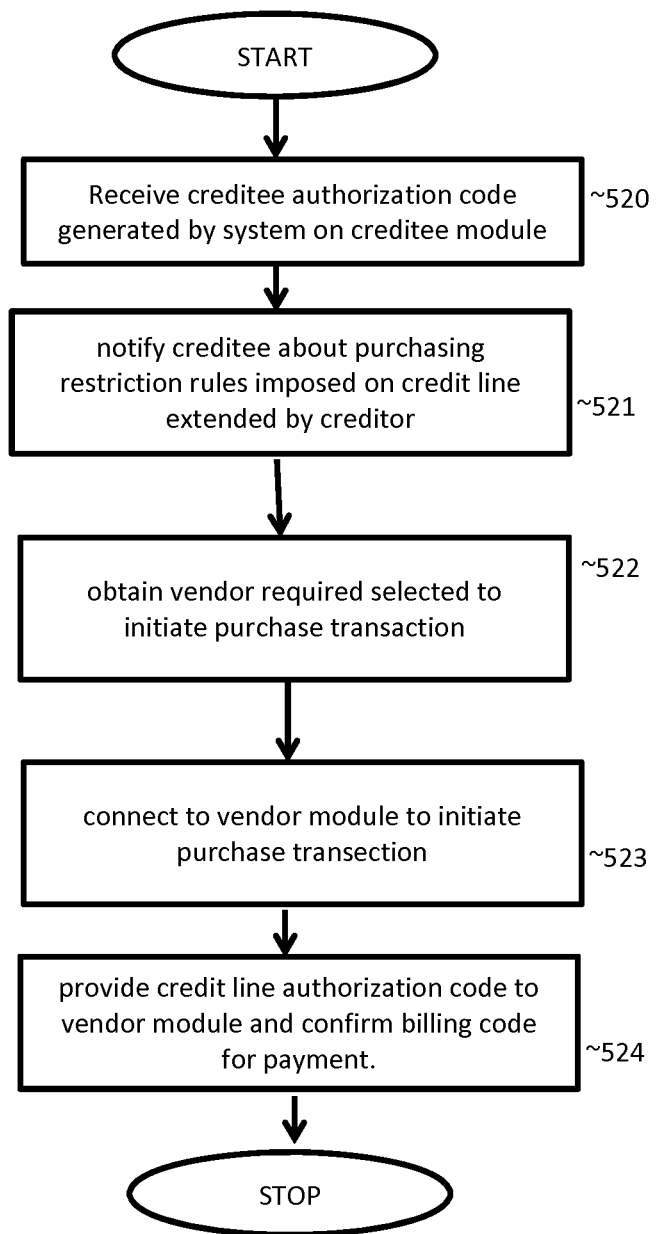
FIG. 3 illustrates steps used by a creditee module to apply the credit authorization code approved by a creditor to a billing code issued by a vendor.

According to the illustration in FIG. 3, once the mobile creditee has received and is ready to make use of the issued credit at a vendor's site, step 520, the creditee module on their device is used to open up a connection to the selected vendor's module resident on a vendor's computer or device under the vendor's control. Prior to opening up the connection to a vendor's module, the system can prompt, for purposes of preventing fraud, the creditee to specify identification information and/or password in order to proceed with the transaction. It should be noted that if the creditee's module detects from the credit related authorization information received from the system server that there is no vendor restriction placed on the credit issued by the mobile creditor, step 521, the mobile creditee can select any vendor they want to complete the purchase, step 522. Alternatively if there is a vendor restriction placed on the credit issued, the creditee's module will allow only the vendors that have not been restricted to be selected by the mobile creditee, step 522.

Upon selection of the correct vendor, the creditee's module will wait to be alerted to open up a connection to the vendor's module, alerting the vendor that a purchase has been approved for execution at their premises within the system, step 523. If the creditee has a billing code provided by the vendor, such information could be entered into the creditee's module and submitted alongside the credit authorization code received from the system server that issued the credit, step 524. If no such billing code exists, the creditee module will alert the creditee to obtain a billing code from the vendor. The vendor module, can also, upon receiving the credit authorization code, check to see if a billing code exists. If a billing code does not exist, a vendor employee, if not in close proximity to the creditee, can use the vendor module to open up a communication link to the mobile device of the creditee. That way, the vendor's employee can identify what purchases or services the creditee wishes to consume at the vendor's facility in order to assign the appropriate billing code to the creditee's credit authorization code received, step 524. As an example, in a restaurant, once a vendor's module receives the credit authorization code from the creditee's module without a billing code, a callback to the creditee's device may simply be to identify their waiter such that a correct billing/transaction code is assigned and linked to the creditee's bill at the restaurant.

Alternatively, a waiter may provide a billing code to the mobile creditee once they are seated at the table such that the creditee provides this information at the time when they are completing the transaction with the vendor. Also a waiter or staff at the restaurant may use the vendor module to link the creditee's credit authorization code to a billing code at the restaurant. As an another example, in a gas station where the creditee is outside waiting to pump gas, either the creditee or the vendor can use their respective modules to open up a communication link, voice, etc., to the other such that a billing code is obtained and linked to the creditees credit authorization code. The gas station, vendor, will then provide a billing code to the creditee and obtain the pump information serving the creditee so that the mobile credit authorization code received by the vendor's module is applied to the correct pump to enable the creditee to pump gas without entering the gas station store.

Figure 4:
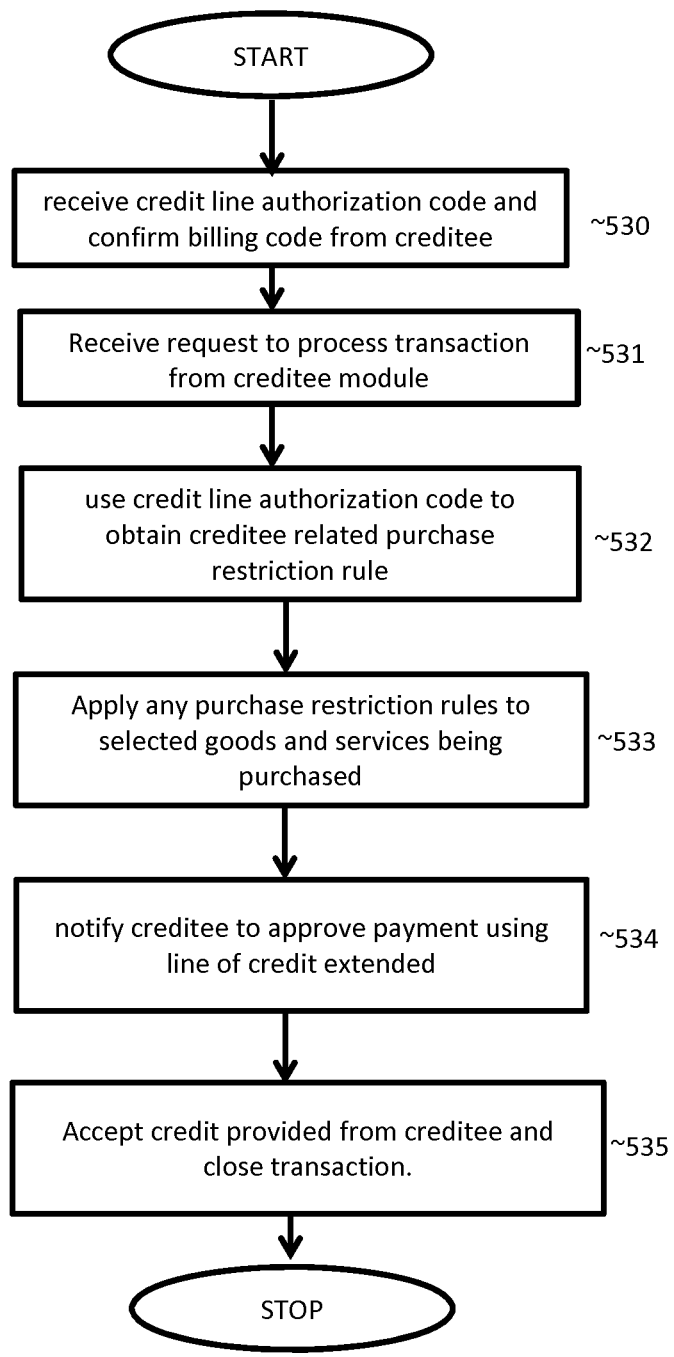
FIG. 4 shows steps used by a vendor module to process a purchase transaction initiated by a mobile creditee using the creditee's authorization code approved by a creditor.

According to the illustration in FIG. 4, once a vendor module receives the credit authorization code and billing code, step 530, it sends an acknowledgement to the creditee's module that it is ready to process the transaction once the creditee is ready. When the creditee is ready to close the transaction, step 531, they can use the creditee module on their device to instruct the vendor's module to apply the credit received to their billing code for payment of the goods and services associated with the billing code.

The vendor's module then proceeds to check, prior to completing the transaction, if there any rules for the vendor to enforce that were prescribed by the mobile creditor, step 532. Assuming the creditor provided rules for enforcement, the vendor module alerts the vendor as to the required rules so they could be applied before the creditee's credit is applied, step 533. As an example, if the vendor module is connected to the POS, the vendor's module may decline to apply credit to any selected item scanned at the POS that is amongst one of the products not approved by the mobile creditor. Any rules to be enforced by the vendor that cannot be done electronically may need to be enforced by the vendor manually, step 533. As a result, there could be an additional fee charge for this extra verification requirement imposed by a mobile creditor as some may even require human intervention.

Once the verification process is complete, the vendor module is instructed to complete the transaction and an alert signal is sent back to the mobile creditee module for acceptance of payment of the bill represented by the billing code using the approved credit line linked to the credit authorization code issued by the mobile creditor, step 534. Upon accepting to pay the bill, step 535, the system server in communication with the vendor, creditee and creditor modules then updates the mobile creditor's account to reflect the transaction and then subsequently notifies the vendor module, creditee module and creditor module that the transaction has been processed successfully. The vendor's account on file is then updated with the billing code, mobile creditee and creditor information; and if a vendor required that transaction funds be transferred to their account at another financial institution, the required information is transmitted to the financial institution and the system is updated appropriately. All other records associated with creditee, creditor and vendor are updated to reflect the processed transaction.

Also as the system server keeps track of credit lines that are to be approved by a mobile creditor, it can directly charge or hold the credit line amount at the financial institution of the creditor prior to approving the line of credit being extended by a creditor to a creditee. Once a creditor's account at financial institution is charged, the system account for the creditor is updated to reflect that the line of credit established for the creditee is available for use and the credit line is held until it is consumed by a creditee or returned back to the creditor as determined by rules of the creditor. That way, absent any fraudulent activity or revocation of an issued credit line, the creditee is always guaranteed that payment will be made for purchases after a credit authorization code is sent to their device from the system. Any unused portion of the credit extended to the creditee by the creditor may be returned to the creditor's account as specified, i.e. if a credit is not used within the time set by the creditor or a maximum time mandated by the system for closure of all instant credit transactions issued to a creditee expires. If the mobile creditor allowed the creditee to hold on to left over credit, the creditees account is updated appropriately after a purchase and the left over credit is reflected on the creditee's module of their wireless device under any terms set by the mobile creditor and system.

In another embodiment, a mobile creditee may not initially know how much credit that they need to request from a mobile creditor until a vendor has provided them with that information i.e. the goods and services being purchased have been tallied at the POS. Under this scenario, the mobile creditee can simply request for credit from a mobile creditor without specifying the amount of credit needed. The creditor may have rules that require the creditee to provide description of product or services to be purchased and other relevant information such as vendor location.

Once the system server receives this information from the mobile creditee's module and successfully executes rules previously disclosed and required by the mobile creditor to process such a transaction, a credit authorization code is transmitted to the mobile creditee's module with relevant credit authorization coded information to allow a vendor's module to complete the transaction when the creditee module connects to the vendor's POS. The credit authorization code may include limitations for type of product or service to purchase and/or a maximum amount, if any, that the mobile creditor is willing to extend. Also, the mobile creditor credit authorization code may include a request for the vendor module to provide a total amount of goods and services being sold to the mobile creditor such that the mobile creditor can accept/deny the request based on the total amount requested. In this scenario, the vendor module, after running the required rules based on credit authorization code will open up a connection to the mobile creditor's module such that an approval of the transaction is obtained based on total cost of goods and services to be sold.

Once the mobile creditor receives an alert from the creditor's module to approve the transaction, they can either accept or decline to finally approve. Upon receiving the appropriate authorization from the mobile creditor's module, the vendor module will accept and complete the transaction as previously discussed or reject the transaction if the mobile creditor declined to pay the total amount requested.

In another preferred embodiment, a mobile creditor can also choose to extend goodwill credit to one or more participating mobile creditees at a specific geographic location that are not registered in their profile as creditees. Under this scenario, mobile creditees may opt to appear visible at any location such that a mobile creditor that wishes to contribute or pay towards a certain good or service for the mobile creditee will be able to search at that location for the existence of one or more mobile creditees that are visible to accept credit. The mobile creditee may also choose to be visible, i.e. pictorially, only to mobile creditors within the same geographic location. The location of the creditee's and creditor's device could be used to establish their presence at a particular location. Alternatively, either party may opt for an infra-red visibility or Bluetooth handshake between their devices within a period of time at a vendor's site for pictorial visibility of one another to be extended. The mobile creditor at that point may use their creditor module to view available participating mobile creditees and pictures of such creditees, if exposed by the creditee, so they can confirm whether a creditee is the person they want to extend credit. Participating mobile creditees may also opt to receive photos of mobile creditors prior to accepting a credit offer to purchase a good or service. Once the creditee accepts the creditor's offer, the credit is applied to the creditee's account for use within the vendor's premises and the creditor's account is charged as previously disclosed. The creditee can use the credit authorization code extended to them to pay for goods and services authorized by the mobile creditor at that vendor's place of business as previously described. Alternatively, the creditor module can simply forward a credit authorization code generated for the creditee to the vendor module such that creditee related expenditures that comply to the purchase restrictions prescribed in the creditor authorization code are applied to the credit line guaranteed by the authorization code when the creditee initiates a purchase transaction.

In another scenario, a mobile creditee upon arriving at a vendor's location can expose a creditee ID created for that location to be held by the vendor's module. Once the creditor identifies a visible creditee as previously disclosed, the creditee's module can reveal their creditee ID for that location to the creditor's module. The creditor can instruct the vendor, via the vendor module to extend a credit to the mobile creditee upon identifying a mobile creditee ID. The vendor's module will forward the request to the mobile creditee alongside the creditor's visibility information, if exposed, to the creditee. The creditee can simply accept or decline the request of the creditor. If the creditee accepts, that vendor module will use the extended credit and apply it to the billing code associated with the mobile creditee. If both parties accept to initiate a text or voice session, the creditee or creditor module of their respective mobile devices can initiate such a session without revealing the phone number of either party. Pictorial information exchanged during the session is scrubbed after the session is terminated as desired by one of the parties.

Also, the mobile creditee of the above embodiment could also initiate such a transaction by using their creditee module to view creditors that are not in their profile that are within the same vendor's site or geographic location and willing to extend credit to mobile creditees at that geographic location or vendor site. The creditee can request for credit from the mobile creditor and the mobile creditor module can process the request using the same methodology prescribed for handling on site request initiated by a mobile creditor and responded to by a mobile creditee. For instance, the mobile creditor can ask for pictorial information of the mobile creditee and then proceed to handle the request as previously disclosed.

In another embodiment, assuming a mobile creditor will be available when the creditee is making a purchase or the creditee feels confident that the creditor will approve the purchase at the time the transaction closes, the creditee need not request for credit in advance but can simply obtained a secure creditor code associated with the creditee from the system server and provide that information to the vendor's module when they decide to close a transaction. The vendor upon closing the transaction will request for payment using the supplied creditor code to the system server. The system server will in turn authenticate the creditor code received from the vendor and execute creditor related rules previously disclosed for the creditee. Upon approval by the creditor, the vendor is provided with a creditor credit authorization code that will be used as previously disclosed by the vendor module to close the transaction.

It should be noted that, the system could be configured to combine credit extended to multiple creditees by one or more creditors to complete payment for good or service at a vendor's facility. The vendor's module may simply extend the same billing code to one or more creditees such that their credit is used to cover a bill in amounts specified by the creditee. Also once a billing code is obtained, each mobile creditee can apply credit towards payment of that bill directly to the vendor using the billing code.

Further, a mobile creditee can also use one billing code obtained from a vendor and apply credit received from more than one creditor to the billing code. That may help the creditee pay for a good or service in a scenario where credit received from single creditor is insufficient i.e. multiple creditors will be able to share the cost related to a good or service incurred by a single creditee. A creditor may also include a rule for enforcement that limits a creditee module from combining any credit extended by the creditor with that of another creditor to close a transaction.

Within the system, mobile creditors can configure rules relating to their creditees as they feel fit since they best understand the spending patterns and financial requirements of each creditee they wish to extend credit to. For instance, a creditee related rule could be configured such that even after a creditor approves a creditees initial request for credit, a vendor's module is always forced to obtain an on the fly approval from the mobile creditor prior to closing a transaction. In this scenario, the vendor module upon detecting such a rule will always initiate a communication to the mobile creditor's module in order to obtain final approval to close the transaction. In the event that a voice approval from the creditor is needed, the system can initiate such a communication link between any of the modules in order to satisfy the rule. Other rules may also include verifying identification related information of a creditee before a transaction is completed. With such a service that is focused on the appetite of a consumer to extend their own credit to someone in need, the potential to generate additional business is enormous.

It should be noted that the embodiments disclosed are preferred and other variations may exist that yield the same result. As an example, communication between any of the modules may be controlled by the system server and functions executed by any of the modules may be delegated to another component within the system to perform the function. System server functions could also be executed by any module or component within the system and vice versa. The advantages derived from each of the disclosed the embodiments may be combined with another as reflected in the claims.

The invention claimed is:

1. A mobile credit system comprising:
a mobile creditee computing device for sending a credit request from a mobile creditee requesting a credit line for use with a vendor to a credit routing system;
the credit routing system, comprising a computing device, for receiving the credit request and identifying at least one mobile creditor who has previously indicated a willingness to make at least a portion of credit held on behalf of the at least one mobile creditor at a third party financial institution available to the mobile creditee;
a mobile creditor computing device for receiving the credit request from the mobile creditee computing device and for responding to the credit request with an approval of the credit request, subject to credit parameters selected by a mobile creditor using the mobile creditor computing device; and
the credit routing system receiving the approval and the credit parameters and transmitting the approval and the credit parameters to the mobile creditee computing device along with purchasing restrictions imposed by the credit parameters that must be applied by the vendor before any funds can be accepted by the vendor for payment from the mobile creditee computing device;
wherein the mobile creditor specifies the credit parameters and the purchasing restrictions, and the credit routing system provides the approval, an authorization code, and the credit parameters in response to the credit request to the mobile creditee computing device; and
wherein the authorization code is linked to one or more rules, provided by the mobile creditor computing device that the vendor must execute prior to accepting payment for a purchase using the credit line.

2. The mobile credit system of claim 1 wherein the credit routing system enables the mobile creditor computing device to request additional information from the mobile creditee in response to the credit request, the additional information selected from the list: vendor name, vendor location, credit line amount and a detail about a purchase for which the credit line is requested.

3. The mobile credit system of claim 1 wherein both the mobile creditee computing device and the mobile creditor computing device are wireless devices in communication with the credit routing system using a wireless network.

4. The mobile credit system of claim 1 wherein the credit request is sent as a part of a purchase transaction initiated at the vendor by the mobile creditee computing device.

5. The mobile credit system of claim 1 wherein the credit routing system identifies one or more mobile creditor computing devices, including the mobile creditor computing device, near a specific geographic location.

6. The mobile credit system of claim 5 wherein the specific geographic location is the immediate vicinity of a location of the vendor.

7. The mobile credit system of claim 1 wherein the vendor directly bills the credit held on behalf of the at least one mobile creditor at a third party financial institution when processing the payment.

8. A method of processing a credit request and approval, the method comprising:
   receiving a credit request for credit for use by a mobile creditee at a vendor, the credit request received from a mobile creditee computing device at a credit routing system, the credit routing system comprising a computing device;
   in response to the credit request, identifying at least one mobile creditor, using the credit routing system, who has previously indicated a willingness to make at least a portion of credit held on behalf of the at least one mobile creditor at a third party financial institution available to the mobile creditee;
   transmitting the credit request to a mobile creditor computing device operated by a mobile creditor;
   receiving, from the mobile creditor computing device in response to the credit request, an approval of the credit request, subject to credit parameters selected by the mobile creditor;
   transmitting the approval and the credit parameters to the mobile creditee computing device along with purchasing restrictions imposed by the credit parameters that must be applied by the vendor before any funds can be accepted by the vendor for payment from the mobile creditee computing device;
   wherein the mobile creditor specifies the credit parameters and the purchasing restrictions, and the credit routing system provides the approval, an authorization code, and the credit parameters in response to the credit request to the mobile creditee computing device; and
   wherein the authorization code is linked to one or more rules, provided by the mobile creditor computing device that the vendor must execute prior to accepting payment for a purchase using the credit line.

9. The method of claim 8 wherein the credit routing system enables the mobile creditor computing device to request additional information from the mobile creditee in response to the credit request, the additional information selected from the list: vendor name, vendor location, credit line amount and a detail about a purchase for which the credit line is requested.

10. The method of claim 8 wherein both the mobile creditee computing device and the mobile creditor computing device are wireless devices in communication with the credit routing system using a wireless network.

11. The method of claim 8 wherein the credit request is sent as a part of a purchase transaction initiated at the vendor by the mobile creditee computing device.

12. The method of claim 8 further comprising identifying one or more mobile creditor computing devices, including the mobile creditor computing device, near a specific geographic location.

13. The method of claim 12 wherein the specific geographic location is the immediate vicinity of a location of the vendor.

14. The method of claim 8 wherein the vendor directly bills the credit held on behalf of the at least one mobile creditor at a third party financial institution when processing the payment.

15. A system for allowing a mobile creditor, using a mobile creditor device, to extend a credit line held at a financial institution to a mobile creditee, the system comprising:
   a mobile creditee device for generating a credit request for a portion of the credit line, receiving information identifying the mobile creditor registered with the system to respond to the credit request, and transmitting the credit request to credit processing system; and
   the credit processing system for receiving the credit request, invoking one or more credit authorization rules that the mobile creditor has established for execution when the credit request is received from the mobile creditee device, confirming that the one or more credit authorization rules are satisfied, and, thereafter, enabling a charge to a portion of the credit line held at the financial institution to be used by the mobile creditee in completing a purchase, and transmitting an authorization code to the mobile creditee along with purchase criteria under which the mobile creditor will allow the credit line to be used by a vendor device for the completion of a purchase by the mobile creditee;
   wherein the mobile creditor specifies the credit authorization rules and the purchase criteria, and the system provides an approval, a credit request confirmation, and the authorization code in response to the credit request to the mobile creditee device; and
   wherein the authorization code is linked to one or more rules, provided by the mobile creditor device that the vendor device must execute prior to accepting payment for the purchase using the credit line.

16. The system of claim 15 wherein the vendor device is configured to accept funds for the payment, after it is determined that, the purchase criteria prescribed by the mobile creditor has been fulfilled.

* * * * *